US009387764B2

(12) United States Patent
Matsuda (10) Patent No.: US 9,387,764 B2
(45) Date of Patent: Jul. 12, 2016

(54) REGENERATIVE BRAKE CONTROL SYSTEM OF ELECTRIC VEHICLE (71) Applicant: KAWASAKI JUKOGYO KABUSHIKI KAISHA, Kobe-shi, Hyogo (JP)

(72) Inventor: Yoshimoto Matsuda, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 14/436,862

(22) PCT Filed: Oct. 22, 2012

(86) PCT No.: PCT/JP2012/006747
§ 371 (c)(1),
(2) Date: Apr. 17, 2015

(87) PCT Pub. No.: WO2014/064728
PCT Pub. Date: May 1, 2014

(65) Prior Publication Data
US 2015/0258898 A1 Sep. 17, 2015

(51) Int. Cl.
*B60L 11/00* (2006.01)
*B62D 61/02* (2006.01)
(Continued)

(52) U.S. Cl.
CPC ... *B60L 7/18* (2013.01); *B60L 7/14* (2013.01); *B60L 7/26* (2013.01); *B60L 11/1803* (2013.01); *B60L 11/1861* (2013.01); *B60L 11/1877* (2013.01); *B60L 15/2009* (2013.01); *B62J 11/00* (2013.01); *H02P 3/14* (2013.01); *B60L 2200/12* (2013.01); *B60L 2210/10* (2013.01);
(Continued)

(58) Field of Classification Search
USPC .............................. 701/22; 180/220
See application file for complete search history.

(56) References Cited

U.S. PATENT DOCUMENTS

| 2012/0080249 A1* | 4/2012 | Yates, III ............... B60L 7/18 180/65.31 |
| 2012/0109483 A1* | 5/2012 | O'Dea ............... B60T 8/1755 701/71 |
| 2013/0220721 A1* | 8/2013 | Matsuda ............... B62K 11/04 180/220 |
| 2013/0226381 A1* | 8/2013 | Yates, III ............... B60L 7/18 701/22 |

(Continued)

FOREIGN PATENT DOCUMENTS

| JP | H08079907 A | 3/1996 |
| JP | H10201008 A | 7/1998 |

(Continued)

OTHER PUBLICATIONS

ISA Japanese Patent Office, International Search Report Issued in Application No. PCT/JP2012/006747, Nov. 20, 2012, WIPO, 4 pages.

*Primary Examiner* — Thomas G Black
*Assistant Examiner* — Tyler Paige
(74) *Attorney, Agent, or Firm* — Alleman Hall McCoy Russell & Tuttle LLP (57) ABSTRACT A regenerative brake control system of an electric motorcycle includes an electric motor, a regeneration adjustment lever, sensors which detect vehicle states, respectively, and a control unit which sets reference regenerative torque according to the vehicle state, and the control unit calculates target torque obtained by compensating the reference regenerative torque based on the detected value of a regeneration amount sensor which detects the operation amount of a regeneration adjustment lever and controls the electric motor such that the electric motor generates regenerative torque.

17 Claims, 6 Drawing Sheets (51) Int. Cl.
*B60L 7/18* (2006.01)
*B60L 7/14* (2006.01)
*B60L 7/26* (2006.01)
*B60L 11/18* (2006.01)
*B60L 15/20* (2006.01)
*B62J 11/00* (2006.01)
*H02P 3/14* (2006.01)

(52) U.S. Cl.
CPC ........ *B60L 2240/12* (2013.01); *B60L 2240/421* (2013.01); *B60L 2240/423* (2013.01); *B60L 2250/16* (2013.01); *B60L 2250/24* (2013.01); *B60L 2250/26* (2013.01); *B62K 2204/00* (2013.01); *Y02T 10/645* (2013.01); *Y02T 10/7005* (2013.01); *Y02T 10/705* (2013.01); *Y02T 10/7044* (2013.01); *Y02T 10/7216* (2013.01); *Y02T 10/7275* (2013.01)

(56) References Cited

U.S. PATENT DOCUMENTS

| | | |
|---|---|---|
| 2013/0282219 A1 | 10/2013 | Matsuda |
| 2014/0058600 A1* | 2/2014 | Hoffmann .............. B62K 3/007 701/22 |
| 2014/0058609 A1* | 2/2014 | Matsuda .................. B62J 99/00 701/22 |
| 2015/0274019 A1* | 10/2015 | Matsuda .................. B62L 1/00 701/22 |

FOREIGN PATENT DOCUMENTS

| | | |
|---|---|---|
| JP | 2003204602 A | 7/2003 |
| JP | 2005143274 A | 6/2005 |
| JP | 2005153842 A | 6/2005 |
| JP | 2009106130 A | 5/2009 |
| WO | 2012090253 A1 | 7/2012 |
| WO | 2012090255 A1 | 7/2012 |

* cited by examiner

REGENERATIVE BRAKE CONTROL SYSTEM OF ELECTRIC VEHICLE

TECHNICAL FIELD

The present invention relates to a regenerative brake control system of an electric vehicle in which an electric motor activates a drive wheel and generates regenerative torque to brake the drive wheel.

BACKGROUND ART

In an electric vehicle which activates a drive wheel by an electric motor, there is known a regenerative system in which the electric motor generates electric power with the rotational force of the drive wheel and supplies the electric power to a battery or the like to convert kinetic energy into electric energy. In this regenerative system, a regenerative braking force is applied to the drive wheel with the electric power generated in the electric motor, and a braking force which is different from a mechanical braking force generated in a brake mechanism can be applied to the drive wheel. For example, Patent Literature 1 discloses a driving control system as an example of the regenerative system.

In the driving control system disclosed in Patent Literature 1, the electric motor generates electric power corresponding to the rotational force of the drive wheel. Therefore, a regenerative braking force works upon the operation of an acceleration operation member such as an accelerator grip being ceased.

CITATION LIST

Patent Literature

Patent Literature 1: Japanese Laid-Open Patent Application Publication No. 2005-143274

SUMMARY OF INVENTION

Technical Problem

However, in the above conventional driving control system, a regenerative braking force is unique to the rotational force of the drive wheel. For this reason, in some cases, the regenerative braking force may be undesirable to a rider.

For example, for a motorcycle, minus torque (regenerative torque) generated during deceleration is not only a braking action, but also an important factor for adjusting the rider's posture when the motorcycle is going to drive into a corner. Therefore, in a vehicle in which the regenerative braking force is uniquely set, the regenerative braking force is sometimes not compatible with the speed at which the vehicle is going to drive into a corner, the degree of quickness to which the vehicle body is banked, or the level of a driving technique. This makes the rider feel discomfort.

Accordingly, an object of the present invention is to provide a regenerative brake control system of an electric vehicle which allows a rider's posture to be controlled easily during deceleration.

Solution to Problem

To achieve the above described object, according to an aspect of the present invention, there is provided a regenerative brake control system comprising: an electric motor; a regeneration operation member which is operated to set a regenerative torque of the electric motor; a detecting device for detecting a vehicle state which is other than a state of the regeneration operation member; and a control unit which sets a reference regenerative torque according to the vehicle state detected by the detecting device; wherein the control unit controls the regenerative torque generated in the electric motor such that a value of the regenerative torque reaches a target value which is a value of an adjusted regenerative torque obtained by compensating the reference regenerative torque based on an operation amount of the regeneration operation member.

In this configuration, a rider can positively adjust a regeneration amount by operating the regeneration operation member according to a driving state, which can improve convenience. For example, in the case of a motorcycle, the rider can finely adjust braking when the motorcycle is starting to turn. This allows the rider to easily drive a vehicle body so that the posture of the vehicle body can be stabilized.

The above regenerative brake control system may further comprise an acceleration operation member which is operated to set an output torque or an acceleration rate of a vehicle, wherein the system sets the reference regenerative torque when an operation amount of the acceleration operation member is equal to or smaller than a predetermined value, and wherein the regeneration operation member is provided separately from the acceleration operation member.

In this configuration, the regeneration amount corresponding to engine braking can be set based on the reference regenerative torque. The reference regenerative torque can be finely adjusted by using the regeneration operation member.

The above regenerative brake control system may further comprise a braking operation member which is operated to mechanically brake a drive wheel, wherein the regeneration operation member may be provided separately from the braking operation member. In this configuration, a regenerative braking (braking using regenerative torque) operation can be performed independently of a braking operation.

The above regenerative brake control system may further comprise a clutch operation member which is operated to perform switching between a driving power cut-off state and a driving power transmitted state, wherein the regeneration operation member may be provided separately from the clutch operation member. In this configuration, a regenerative braking operation can be performed independently of a clutch operation.

The regeneration operation member may be movable and may be configured such that the regenerative torque increases as an amount of movement of the regeneration operation member increases. In this configuration, the regeneration operation member can be operated naturally according to the rider's sense. For example, a lever may be moved as the regeneration operation member.

The regeneration operation member may be configured to select one from among a plurality of adjusted regeneration amounts. For example, mode shifting may be performed by a switch. Or, once the mode is set, the set value may be maintained until the setting is changed. In this configuration, the rider can easily set the adjusted regeneration amount according to the rider's preference.

Advantageous Effects of Invention

In accordance with the present invention, it becomes possible to provide a regenerative brake control system of an electric vehicle which allows a rider's posture to be controlled easily during deceleration.

DESCRIPTION OF EMBODIMENTS

Hereinafter, the embodiment of the present invention will be described with reference to the accompanying drawings. Hereinafter, the stated directions are referenced from the perspective of a rider riding in an electric motorcycle 1 which is the embodiment of an electric vehicle of the present invention. Throughout the drawings, the same or corresponding components are identified by the same reference symbols and will not be described repeatedly, except otherwise noted.

Figure 1:
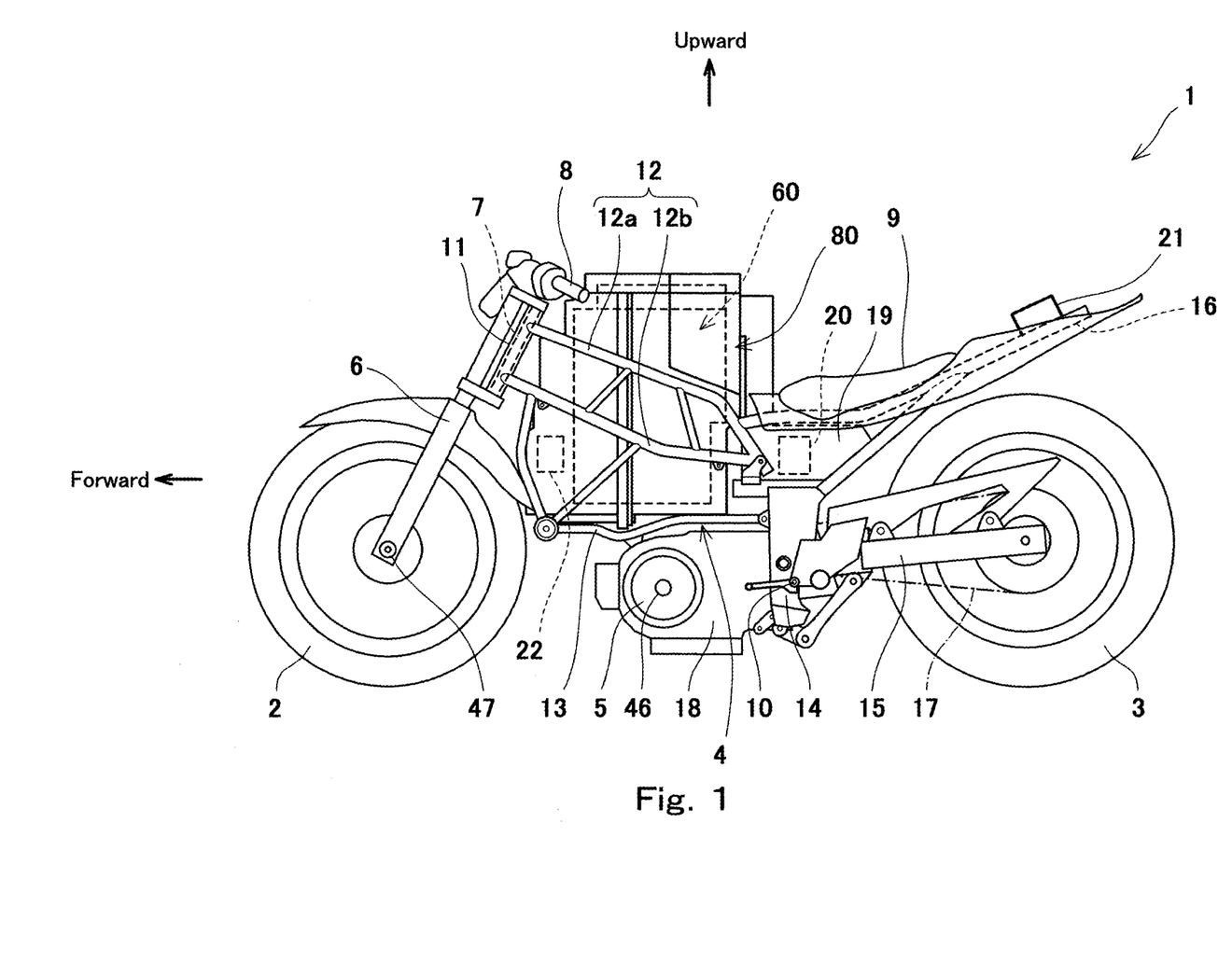
FIG. 1 is a left side view of an electric motorcycle including a regenerative brake control system according to an embodiment of the present invention.

FIG. 1 is a left side view of the electric motorcycle 1. As shown in FIG. 1, the electric motorcycle 1 includes a front wheel 2 which is a driven wheel, a rear wheel 3 which is a drive wheel, a vehicle body frame 4 placed between the front wheel 2 and the rear wheel 3, and an electric motor 5 as a driving power source for the electric motorcycle 1. The electric motorcycle 1 of the present embodiment does not include an internal combustion engine, and is able to drive on a road by rotating the rear wheel 3 with a driving power generated in the electric motor 5.

The front wheel 2 is rotatably mounted to the lower end portion of a front fork 6. The front fork 6 is coupled to a bar-type handle 8 via a steering shaft 7. In the present embodiment, a vehicle speed sensor 47 is attached to the front wheel 2 at the lower end portion of the front fork 6. The steering shaft 7 is rotatably supported on a head pipe 11. The head pipe 11 is provided with a main frame 12. A pivot frame 14 is mounted to the rear lower end portion of the main frame 12. The pivot frame 14 is provided with a swing arm 15. The swing arm 15 is pivotally joined at its front end portion to the pivot frame 14. The rear wheel 3 is rotatably mounted to the rear end portion of the swing arm 15. A seat rail 16 is provided on the rear end portion of the main frame 12. A rider straddle seat 9 is mounted onto the seat rail 16.

The electric motorcycle 1 is a straddle-type vehicle. The rider straddles the seat 9 and is seated thereon. The rider straddling the seat 9 and facing forward can grip the handle 8 with stretched hands. The rider straddling the seat 9 puts the rider's left leg on a left foot step 10 in a location which is leftward relative to the left part of the pivot frame 14, and puts the rider's right leg on a right foot step 10 in a location which is rightward relative to the right part of the pivot frame 14. Since the rider straddles a vehicle body in this way, the straddle-type vehicle has a small width in at least a region in the vicinity of the seat 9. In particular, the motorcycle makes a turn in a state in which a centripetal force generated by banking the vehicle body is balanced with a centrifugal force.

The electric motorcycle 1 includes a motor case 18, an inverter case 19, and a battery case 80. The motor case 18 accommodates an electric motor 5. The inverter case 19 accommodates electric components including an inverter unit 20. The battery case 80 accommodates electric components including a high-voltage battery unit 60 (hereinafter will be simply referred to as battery unit 60) for storing electric power supplied to the electric motor 5. The battery unit 60 is able to store DC power. The inverter unit 20 converts the DC power stored in the battery unit 60 into AC power.

The electric motor 5 operates with the AC power supplied from the inverter unit 20 to the electric motor 5 to generate a driving power for moving the vehicle body. The electric motor 5 is, for example, an AC motor. As other examples of the electric motor 5, there are a brushless DC motor, a synchronous electric motor, an inductive electric motor, etc. The driving power generated in the electric motor 5 is transmitted to the rear wheel 3 via a driving power transmission mechanism 17. The electric motor 5 is configured to generate the electric power with a rotational force transmitted from the rear wheel 3 to the electric motor 5 via the driving power transmission mechanism 17, during deceleration.

The driving power transmission mechanism 17 includes a transmission (not shown, here). The transmission is accommodated together with the electric motor 5 in the motor case 18. The driving power transmission mechanism 17 is, for example, a chain, a belt, or a drive shaft. During driving, the driving power transmission mechanism 17 transmits output torque of the electric motor 5 to the rear wheel 3 as the drive wheel, while during deceleration, the driving power transmission mechanism 17 transmits the rotational force of the rear wheel 3 to the electric motor 5.

Next, the configuration of a regenerative brake control system 100 included in the electric motorcycle 1 will be specifically described with reference to FIG. 2.

Figure 2:
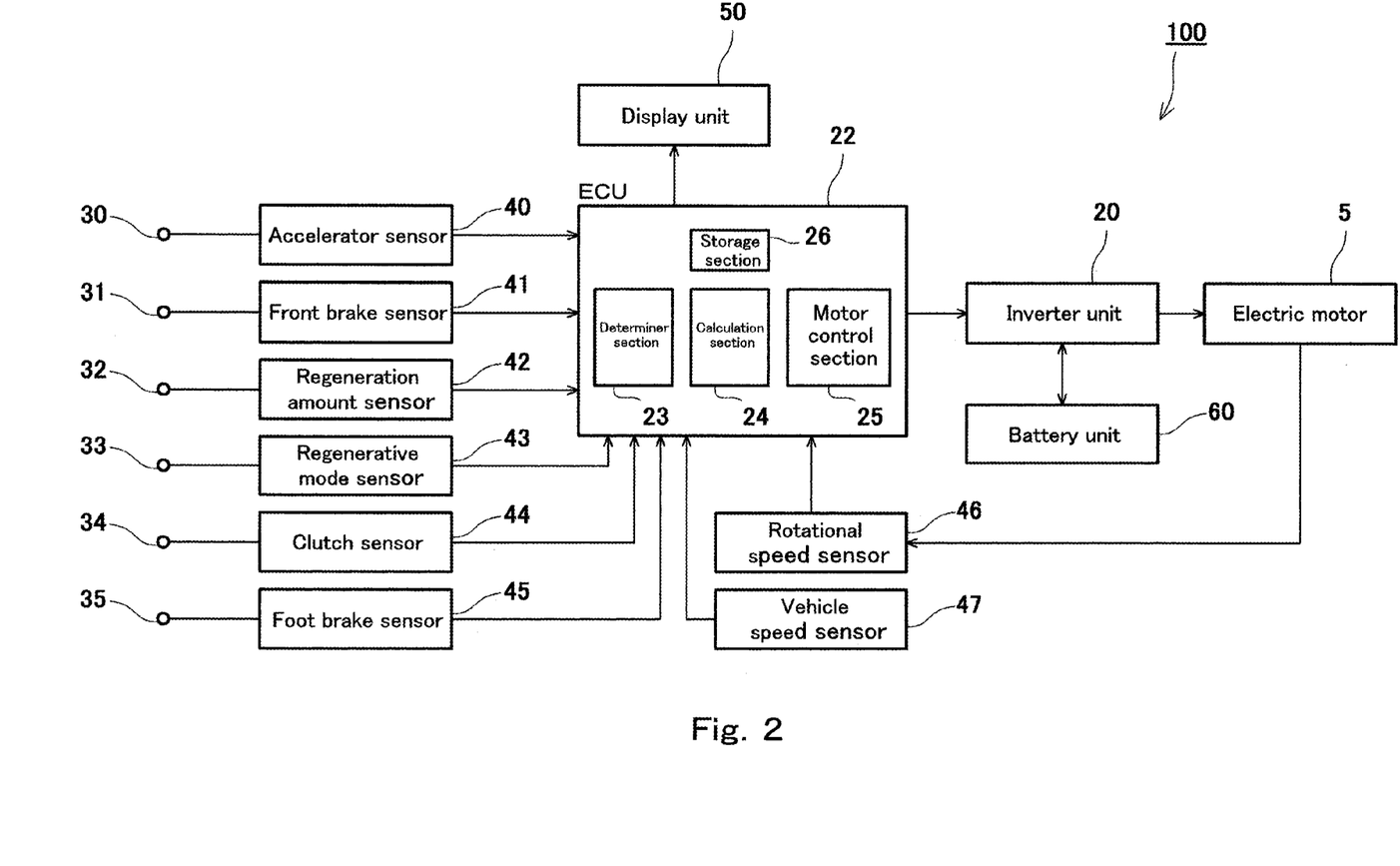
FIG. 2 is a block diagram showing the configuration of the regenerative brake control system according to the embodiment of the present invention.

As shown in FIG. 2, the regenerative brake control system 100 includes the electric motor 5 as a driving power source, the battery unit 60 as an electric power supply unit for the electric motor 5, the inverter unit 20, a control unit 22 for controlling the electric motorcycle 1, operation members 30 to 35 placed in proper locations of the electric motorcycle 1, sensors 40 to 47 for detecting vehicle states, and a display unit 50 for displaying a speed, etc. In FIG. 2, only the battery unit 60 as the electric power supply unit for the electric motor 5 is shown, and the control unit 22 and the other electric components are not shown.

The electric motor 5 is connected to the battery unit 60 via the inverter unit 20. The electric motor 5 performs power running as an electric motor during acceleration/driving of the electric motorcycle 1 and performs regenerative running as an electric generator during deceleration of the electric motorcycle 1. During the power running, the electric motor 5 operates with the AC power supplied from the inverter unit 20 to the electric motor 5 to generate the driving power for moving the vehicle body. During the power running, the electric motor 5 outputs driving torque as a driving force to the drive wheel through an output shaft thereof. During the regenerative running, the electric motor 5 generates the electric power with the rotational force transmitted from the rear wheel 3 to the electric motor 5. The electric power generated in the electric motor 5 is charged into the battery unit 60 via the inverter unit 20. During the regenerative running, the electric motor 5 generates regenerative torque as a braking force applied to the rear wheel 3 through the output shaft.

The battery unit 60 is connected to the inverter unit 20 and configured to be charged and discharged via the inverter unit 20. During the power running of the electric motor 5, the battery unit 60 is discharged, while during the regenerative running of the electric motor 5, the battery unit 60 is charged.

The control unit 22 includes a determiner section 23 configured to receive information input by the operation members 30 to 35 provided in the locations of the electric motorcycle 1, and other information indicating the vehicle states, from the sensors 40 to 47, and to determine whether or not a regeneration condition is satisfied based on the received information. In the present embodiment, the regeneration condition is defined as conditions relating to the vehicle states, which are used to determine whether or not to shift the electric motor 5 to the regenerative running.

The control unit 22 includes a calculation section 24 configured to perform a target torque calculating process as will be described later, based on the information indicating the vehicle states which are detected by the sensors 40 to 47, according to a result of the determination performed by the determiner section 23. The target torque is defined as a target value of the output torque to be generated in the electric motor 5. In a case where the target torque is a positive value, this means that the control unit 22 provides a command to the inverter unit 20 and shifts the electric motor 5 to the power running to allow the electric motor 5 to generate driving torque which is equal to target driving torque. On the other hand, in a case where the target torque is a negative value, this means that the control unit 22 provides a command to the inverter unit 20 and shifts the electric motor 5 to the regenerative running to allow the electric motor 5 to generate regenerative torque which is equal to target regenerative torque. In the present embodiment, the calculation section 24 decides the target torque based on the detected value of an accelerator operation amount and the detected value of a motor rotational speed. Then, the calculation section 24 provides the decided target torque to a motor control section 25.

The control unit 22 includes the motor control section 25 configured to activate the electric motor 5 such that its speed is changeable, by using the inverter unit 20 as a power converter, and to control instantaneous torque of the electric motor 5 during the activation. The electric motor 5 is activated such that its speed is changeable by using the power converter in a well-known manner, which will not be described herein.

The control unit 22 includes a storage section 26 configured to store data such as the target torque, programs, information indicating the vehicle states detected by the sensors, etc. Alternatively, the storage section 26 may contain a torque map indicating the detected value of the accelerator operation amount and the value of the target torque defined by the detected value of the motor rotational speed.

The control unit 22 is configured as a processor constituting a microcontroller or the like, and operation programs. The processor executes specified operation programs to perform the corresponding processing, thereby performing functions. The storage section 26 may be implemented by a memory of the microcontroller, or other external memory.

Hereinafter, the configuration of the operation members 30 to 35 and the configuration of the sensors 40 to 47, in the electric motorcycle 1, will be described with reference to FIG. 3, as well as FIG. 2.

Figure 3:
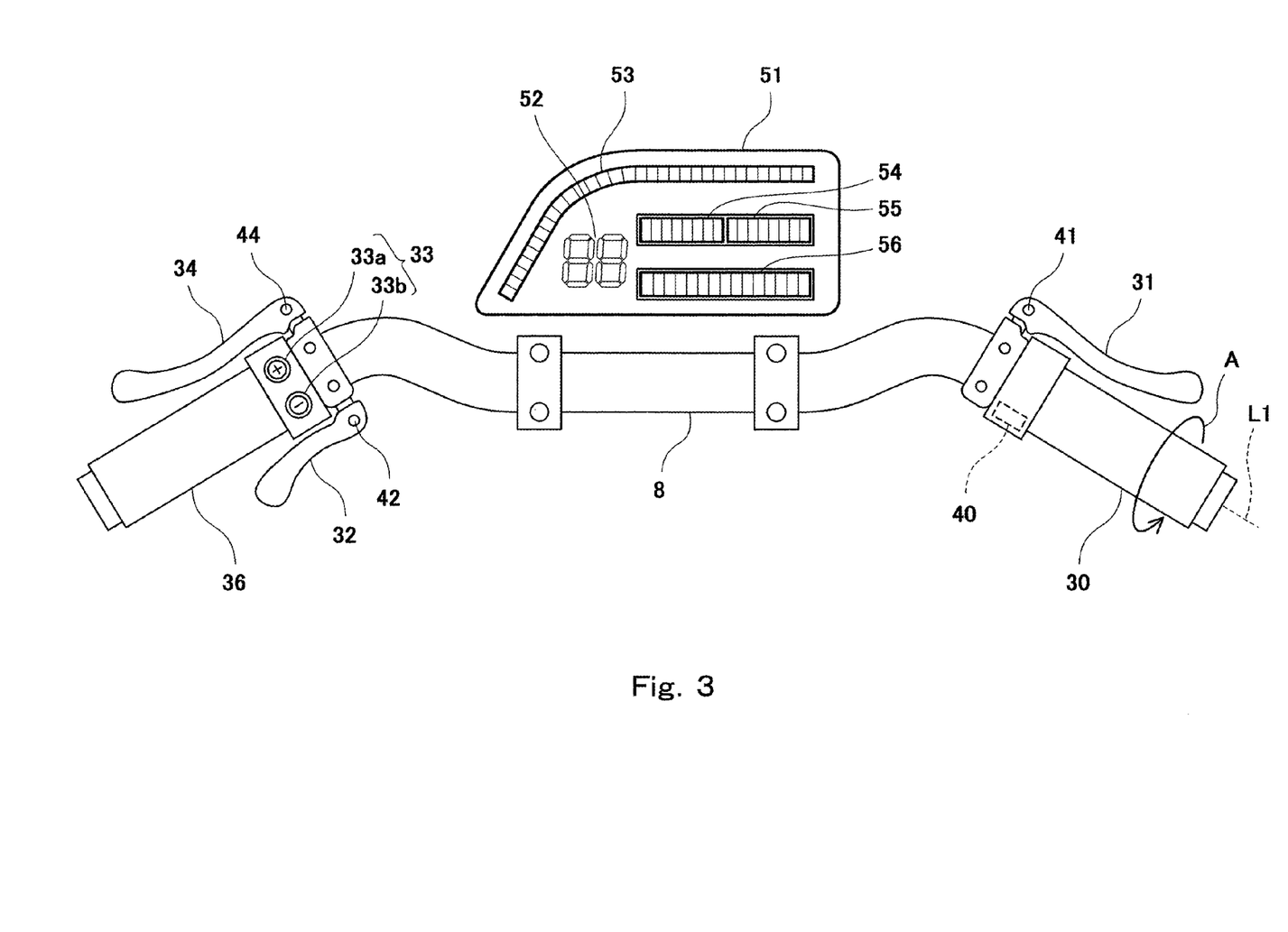
FIG. 3 is an enlarged plan view of a region in the vicinity of a handle of the electric motorcycle of FIG. 1.

As shown in FIG. 3, the handle 8 as a steering device includes a pair of right and left grips 30, 36. As shown in FIG. 3, the pair of right and left grips 30, 36 which are gripping members are provided at the right end portion and the left end portion of the handle 8, respectively. The right grip 30 is an accelerator grip for inputting an acceleration command (more specifically, torque command for the power running) for rotating the rear wheel 3 in an accelerative manner. The accelerator grip 30 which is an acceleration operation member is rotatable around an axis L1 along which the handle 8 extends, and is placed in a predetermined reference position in a state in which the accelerator grip 30 is not operated by the rider.

The accelerator grip 30 is attached with an accelerator grip sensor 40. The accelerator grip sensor 40 provides to the control unit 22 an acceleration command corresponding to an angular displacement amount (hereinafter will be simply referred to as "accelerator operation amount") θ from the reference position of the grip. The motor control section 25 of the control unit 22 adjusts the output torque of the electric motor 5 via the inverter unit 20, in response to this acceleration command.

A brake lever 31 is placed in front of the accelerator grip 30. The brake lever 31 is an operation member which is operated to activate a front wheel brake mechanism (not shown) provided for the front wheel 2. When the rider pulls the brake lever 31 toward the rider (in a direction which is closer to the rider), the front wheel brake mechanism is activated to apply a mechanical braking force to the front wheel 2. By adjusting the displacement amount of the brake lever 31, the braking force applied to the front wheel 2 can be adjusted. The brake lever 31 is attached with a brake sensor 41. The brake sensor 41 detects whether or not the brake lever 31 has been operated, and sends a detected signal to the control unit 22.

In the present embodiment, a regeneration adjustment lever 32 is provided behind the left grip 36 of the handle 8. The regeneration adjustment lever 32 serves as a first operation member for adjusting the regenerative torque generated in the electric motor 5 during the regenerative running. The regeneration adjustment lever 32 can be gripped together with the left grip 36 with the rider's left thumb put on the regeneration adjustment lever 32. When the rider pushes the regeneration adjustment lever 32 with the rider's left thumb in a direction away from the rider, the regeneration adjustment lever 32 is pivotable to be away from a predetermined reference position. The regeneration adjustment lever 32 is applied with a biasing force for returning the regeneration adjustment lever 32 to the reference position. When the rider releases the regeneration adjustment lever 32 in a state in which the rider pushes the regeneration adjustment lever 32 with the rider's left thumb in the direction away from the rider, the regeneration adjustment lever 32 returns to the reference position.

The regeneration adjustment lever 32 is attached with a regeneration amount sensor 42 for detecting the operation amount of the regeneration adjustment lever 32. The regeneration amount sensor 42 is a position sensor which outputs the adjustment command of the regenerative torque according to a position (i.e., operation amount) with respect to the predetermined reference position. The regeneration amount sensor 42 is connected to the control unit 22 and sends the adjustment command of the regenerative torque to the control unit 22. The control unit 22 adjusts the regenerative braking force of the electric motor 5 during the regenerative running, in response to the received adjustment command of the regenerative torque. In the present embodiment, the adjustment command of the regenerative torque is set so that the regenerative toque increases as the operation amount of the regeneration adjustment lever 32 increases. In this way, the regenerative toque can be adjusted to be increased.

Further, in the present embodiment, the left grip 36 of the handle 8 is attached with a regenerative mode switch 33. The regenerative mode switch 33 serves as a second operation member which is operated to adjust the regenerative toque generated in the electric motor 5 during the regenerative running. In the present embodiment, the regenerative mode switch 33 selects one from among a plurality of adjusted regeneration amounts. Hereinafter, the adjusted regeneration amount selected by the regenerative mode switch 33 will be referred to as a regenerative mode. The regenerative mode switch 33 includes two input buttons which are an upshifting button 33a and a downshifting button 33b. When the rider pushes either the upshifting button 33a or the downshifting button 33b with the rider' left thumb while gripping the left grip 36, a desired regenerative mode can be selected. Or, in a case where the rider does not select a desired regenerative mode by using the regenerative mode switch 33, a preset normal regenerative mode is automatically selected.

The regenerative mode switch 33 is attached with a regenerative mode sensor 43 for detecting a command input by the regenerative mode switch 33. The regenerative mode sensor 43 is a switching sensor. In this example, the regenerative mode sensor 43 detects whether or not either one of the two input buttons, which are the upshifting button 33a and the downshifting button 33b, has been operated. The regenerative mode sensor 43 is connected to the control unit 22 and sends a detected signal to the control unit 22. The regenerative mode switch 33 for selecting the regenerative mode may be attached to the display unit 50 which displays the values of meters and the like.

As shown in FIGS. 2 and 3, the electric motorcycle 1 includes a clutch lever 34. The clutch lever 34 is placed in front of the left grip 36. In the present embodiment, the clutch lever 34 serves as an operation member which performs switching between a driving power cut-off state and a driving power transmitted state. The clutch lever 34 so configured is attached with a clutch sensor 44. The clutch sensor 44 is a switching sensor and detects whether or not the clutch lever 34 has been operated. The clutch sensor 44 is connected to the control unit 22, and sends a detected signal to the control unit 22.

As shown in FIG. 2, the electric motorcycle 1 includes a foot brake lever 35. The foot brake lever 35 is an operation member which is operated to activate a rear wheel brake mechanism (not shown) provided for the rear wheel 3. When the rider presses down the tip end portion of the foot brake lever 35, the rear wheel brake mechanism is activated to apply a mechanical braking force the rear wheel 3. By adjusting the displacement amount of the foot brake lever 35, the mechanical braking force applied to the rear wheel 3 can be adjusted. The foot brake lever 35 so configured is attached with a foot brake sensor 45. The foot brake sensor 45 is a switching sensor and detects whether or not the foot brake lever 35 has been operated. The foot brake sensor 45 sends a detected signal to the control unit 22.

As shown in FIG. 2, the electric motorcycle 1 includes a motor rotational speed sensor 46 and a vehicle speed sensor 47, as the sensors for detecting the other vehicle states. The motor rotational speed sensor 46 detects the rotational speed of the electric motor 5, while the vehicle speed sensor 47 detects the speed of the electric motorcycle 1. The motor rotational speed sensor 46 and the vehicle speed sensor 47 are connected to the control unit 22, and send the detected signals to the control unit 22.

As shown in FIGS. 2 and 3, the electric motorcycle 1 includes the display unit 50 for displaying the speed, and others. The display unit 50 displays the vehicle states based on the information sent from the control unit 22 to the display unit 50. As shown in FIG. 3, a display panel 51 of the display unit 50 is implemented by an instrument panel and placed in front of the handle bar 8 at the center in a vehicle width direction. The display panel 51 includes a speed display section 52 which displays the speed per hour in a digital format, a motor rotational speed display section 53 which displays the rotational speed of the electric motor 5, a regenerative torque display section 54 which displays the regenerative torque, an accelerative torque display section 55, and a SOC (state of charge) display section 56 which displays the SOC of the battery. In addition to these, a driving mode, a gear ratio, a driving distance, a time, etc., may be displayed on the display panel 51.

The handle 8 is attached with a main switch (not shown) which provides a command for starting to supply the electric power to the major electric components of the electric motorcycle 1 or ceasing to supply the electric power to the major electric components. The main switch is also configured to activate the regenerative brake control system 100. The main switch may be, for example, a push button switch, a rotatable switch which is inserted and rotated, such as a key cylinder, or a switch configured to provide a start command by holding, over the switch, an IC card or a portable terminal which enables wireless communication.

Figure 4:
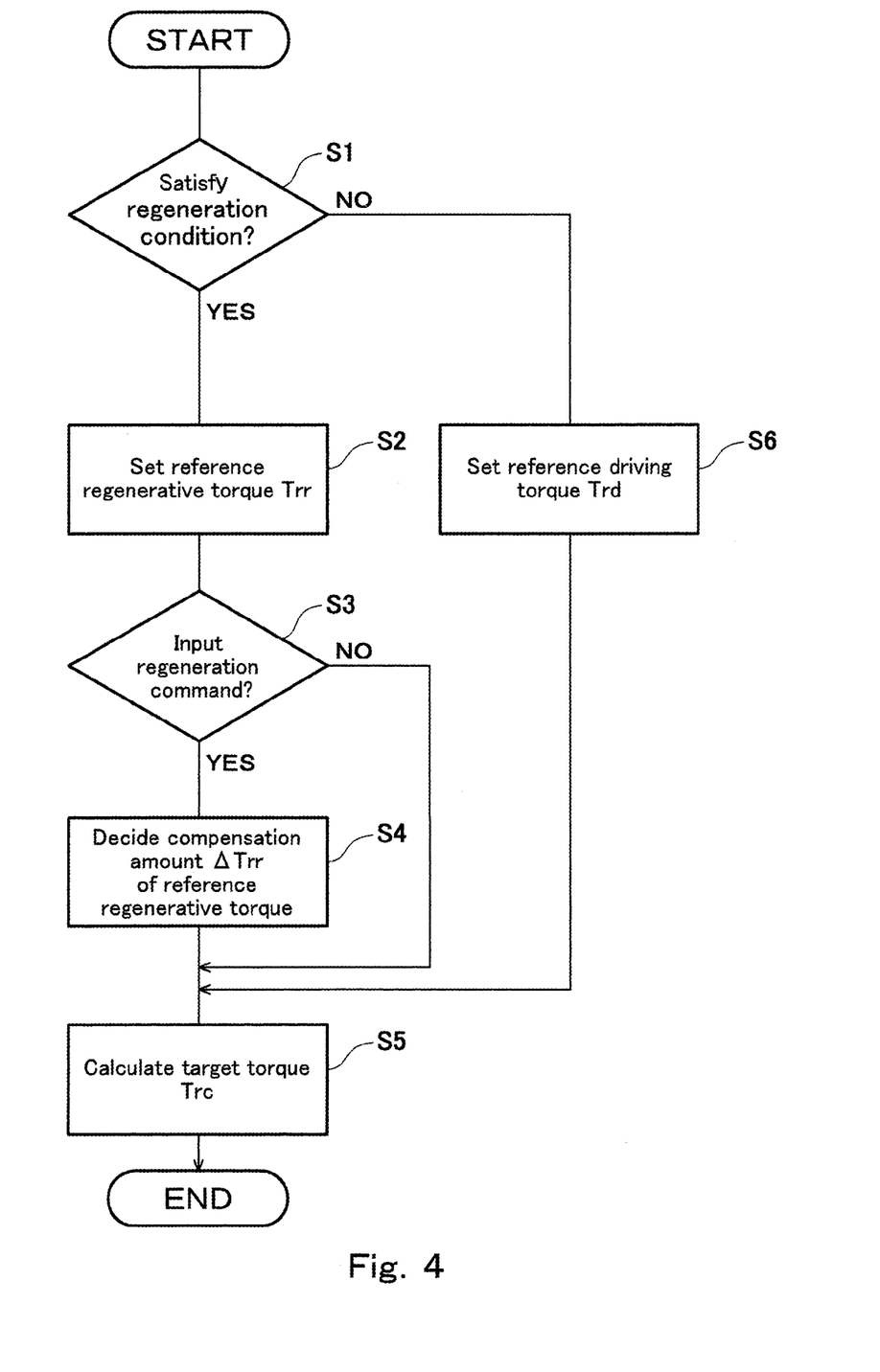
FIG. 4 is a flowchart showing a target torque calculating process performed by the regenerative brake control system of FIG. 2.

The target torque calculating process performed by the control unit 22 in the regenerative brake control system 100 configured above will be described with reference to the flowchart of FIG. 4. In the present embodiment, it is assumed that the electric motorcycle 1 has started and is driving on a road in a state in which the electric motor 5 is in the power running state. The processing performed by the control unit 22 is sequentially performed in predetermined calculating process cycles.

Initially, the control unit 22 determines whether or not the vehicle state of the electric motorcycle 1 being driving on the road satisfies the regeneration condition (step 1). The regeneration condition is defined as the condition relating to any of the vehicle states, which is used to determine whether or not to shift the electric motor 5 to the regenerative running. In the present embodiment, the regeneration condition is such that the accelerator operation amount is 0[%] and a change $\Delta TH$ in the accelerator operation amount which occurs with time and is just before the accelerator operation amount reaches 0[%], is not a positive value, for example, a negative value. The determiner section 23 determines whether or not the regeneration condition is satisfied based on the detected value received from the accelerator grip sensor 40. The phrase "the accelerator operation amount is 0[%]" is defined as a state in which the accelerator grip 30 is not operated by the rider, i.e., the accelerator grip 30 is returned from the reference position to an operation amount which is within a specified range (e.g., the angular displacement amount $\theta$ of the grip is equal to or larger than 0 degree and equal to or smaller than 1degree).

When the determiner section 23 of the control unit 22 determines that the regeneration condition is satisfied, the calculation section 24 of the control unit 22 sets reference regenerative torque $T_{rr}$ which is the reference value of the target torque according to the vehicle state to cause the electric motor 5 to generate the regenerative torque (step 2). In the present embodiment, the reference regenerative torque is set based on the detected value of the motor rotational speed and the detected value of the accelerator operation amount. The calculation section 24 sets the reference regenerative torque as the reference value of the target torque, based on the detected value received from the accelerator grip sensor 40 and the detected value received from the motor rotational speed sensor 46.

Specifically, the reference regenerative torque is set such that the reference regenerative torque decreases as the motor rotational speed is closer to zero, when a motor rotational speed range is equal to or less than first value X1 (see FIG. 5) and decreases as the motor rotational speed increases when the motor rotational speed range is equal to or larger than second value X2 (see FIG. 5), which is larger than the first value X1. In addition, the reference regenerative torque is set such that the reference regenerative torque increases as a change in an accelerator opening degree, which occurs with time until the accelerator operation amount reaches zero, increases. The change in the accelerator operation amount which occurs with time may be a change in the accelerator operation amount which occurs with time before the regeneration condition is satisfied. Or, in a case where the regeneration condition is satisfied even when the accelerator operation amount is equal to or larger than zero, the change in the accelerator operation amount which occurs with time may be a change in the accelerator operation amount which occurs with time after the regeneration condition is satisfied.

Then, the determiner section 23 of the control unit 22 determines whether or not the regeneration adjustment lever 32 has been operated to input a command (step 3). The determiner section 23 determines whether or not the regeneration adjustment lever 32 has been operated to input a command, based on the detected value of the regeneration amount sensor 42.

When the determiner section 23 determines that the regeneration adjustment lever 32 has been operated to input a command, the calculation section 24 of the control unit 22 calculates a compensation amount $\Delta T_{rr}$ of the reference regenerative torque based on the operation amount of the regeneration adjustment lever 32, i.e., the adjustment command of the regenerative torque which is detected by the regeneration amount sensor 42 (step 4). On the other hand, when the determiner section 23 determines that the regeneration adjustment lever 32 has not been operated to input a command, the calculation section 24 sets the compensation amount $\Delta T_{rr}$ of the reference regenerative torque, to zero.

Finally, the calculation section 24 of the control unit 22 calculates target torque $T_{rc}$ based on the reference regenerative torque $T_{rr}$ and the compensation amount $\Delta T_{rr}$, more specifically, by adding the compensation amount $\Delta T_{rr}$ to the value of the reference regenerative torque $T_{rr}$ (step 5). Then, the calculation section 24 provides the calculated target torque $T_{rc}$ to the motor control section 25.

In the above described manner, the rider can positively adjust the braking amount of the regenerative brake, by using the regeneration adjustment lever 32, in addition to the mechanical braking force applied by a front brake and a foot brake, according to the driving state of the electric motorcycle 1. For example, when the rider is going to drive into the corner, the rider can adjust the regenerative braking according to the rider's intention to adjust the posture of the vehicle body. In this way, the rider can easily move the vehicle body while stabilizing its posture.

On the other hand, when the determiner section 23 of the control unit 22 determines that the regeneration condition is not satisfied, in step S1, the power running of the electric motor 5 is continued. In this case, to allow the electric motor 5 to continue to generate the driving torque, the calculation section 24 of the control unit 22 sets reference driving torque $T_{rd}$ which is reference target torque according to the vehicle states (step 6). In the present embodiment, the reference driving torque is set to a positive value based on the detected value of the motor rotational speed and the detected value of the accelerator operation amount. The calculation section 24 sets the reference driving torque which is the reference target torque based on inputs such as the detected value of the accelerator grip sensor 40 and the detected value of the motor rotational speed sensor 46. In this case, the calculation section 24 sets the value of the reference driving torque $T_{rd}$ to the target torque $T_{rc}$ and sends this target torque $T_{rc}$ to the motor control section 25. In this way, the electric motorcycle 1 continues to drive on the road without performing the regenerative braking.

Figure 5:
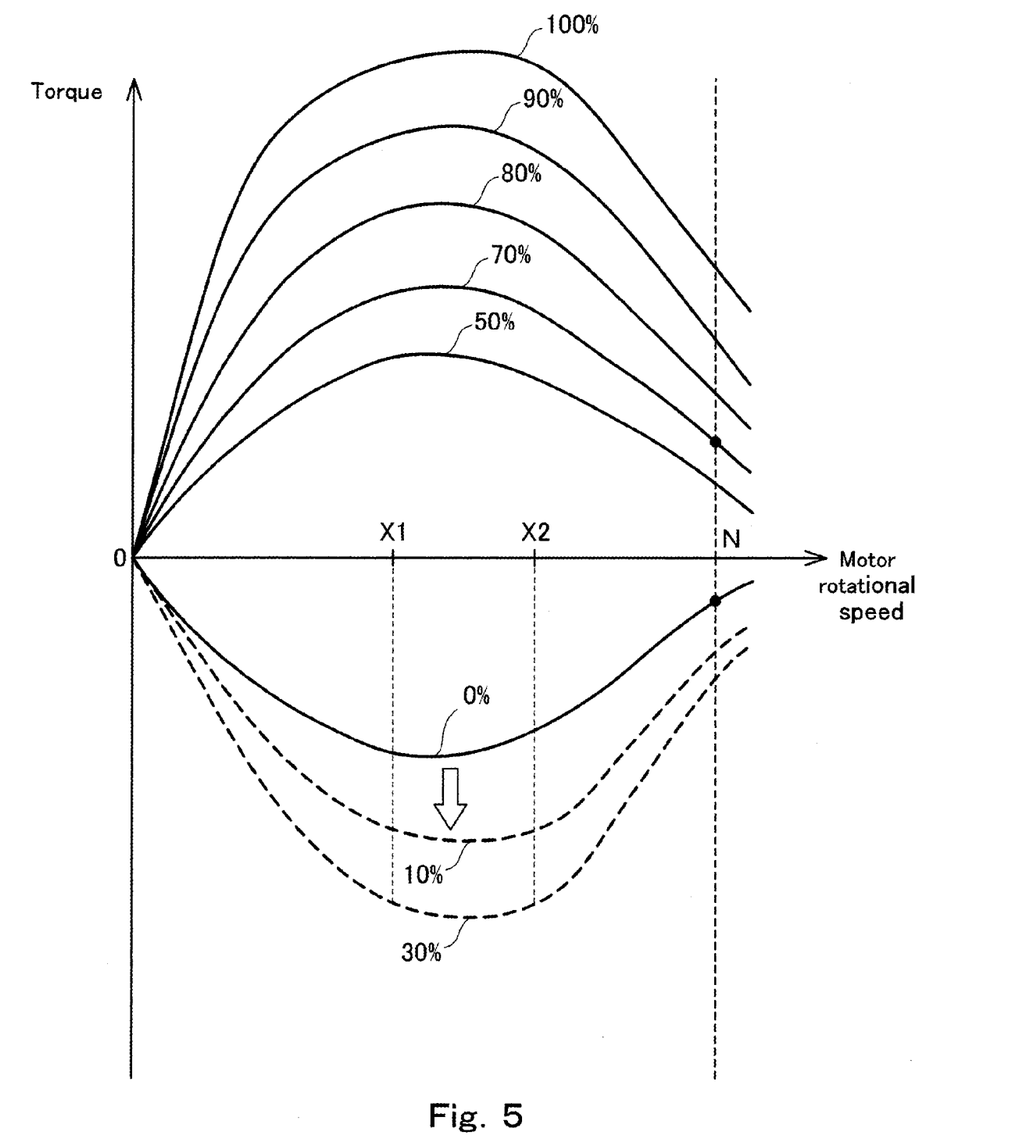
FIG. 5 is a graph schematically showing the characteristic of output torque of an electric motor in the regenerative brake control system of FIG. 2.

FIG. 5 is a graph schematically showing the characteristic of the output torque generated in the electric motor 5 in the regenerative brake control system 100. In FIG. 5, a horizontal axis indicates the motor rotational speed, while a vertical axis indicates the motor output torque.

Curves in the positive value range of the output torque indicate the characteristics of the output torque of the electric motor 5 during the power running, such that these curves correspond to the accelerator operation amounts, respectively. These curves indicate the torque characteristics corresponding to the accelerator operation amounts of 100%, 90%, 80%, 70% and 50%, respectively, from the top. As can be seen from these graphs, the driving torque generated in the electric motor 5 during the power running increases, as the accelerator operation amount increases.

By comparison, curves in the negative value range of the output torque indicate the characteristics of the output torque of the electric motor 5 during the regenerative running (accelerator operation amount is 0%).

The curves indicated by broken lines indicate a difference in output torque characteristic which occurs due to a difference in the operation amount of the regeneration adjustment lever 32 during the regenerative running. In the graphs, the broken lines indicate the output torque characteristic corresponding to the lever operation amount of 10% and the output torque characteristic corresponding to the lever operation amount of 30%, respectively. In the present embodiment, the adjustment command of the regenerative torque is set such that the regenerative torque increases as the displacement amount of the regeneration adjustment lever 32 increases. Therefore, the regenerative torque increases with an increase in the operation amount of the regeneration adjustment lever 32.

Therefore, in accordance with the present embodiment, during the regenerative braking of the electric motorcycle 1, the rider can positively adjust the regenerative braking amount, by using the regeneration adjustment lever 32, according to the driving state of the electric motorcycle 1.

In addition, since the regeneration adjustment lever 32 is provided, it is not necessary to set the reference regenerative torque corresponding to all riders. In other words, the rider has only to set as the reference regenerative torque a base regeneration amount which is a minimum required, according to various driving states. This allows the rider to easily set the reference regenerative torque. For example, in a case where braking is performed during driving on a downward slope according to its inclination degree, or braking is performed in the vehicle having a heavier weight, and thereby the reference regenerative torque is insufficient, the regeneration amount can be increased by the rider's operation, with respect to the reference regenerative torque. In the case of the motorcycle in which the front wheel is mounted to the front fork and the rear wheel is mounted to the swing arm, like the electric motorcycle 1 of the present embodiment, a pitching occurs, in which the vehicle body is angularly displaced around the axis extending in a vehicle width direction, by the front wheel mechanical braking, and a force for causing the rear portion of the seat to be raised up is generated. Unlike the front wheel braking, in the regenerative braking, a force for causing the rear portion of the seat to be moved down is generated. In this way, the rear wheel regenerative braking makes it possible to well control the posture of the vehicle body around the time when the electric motorcycle 1 is going to drive into the corner, as compared to the front wheel mechanical braking.

Figure 6:
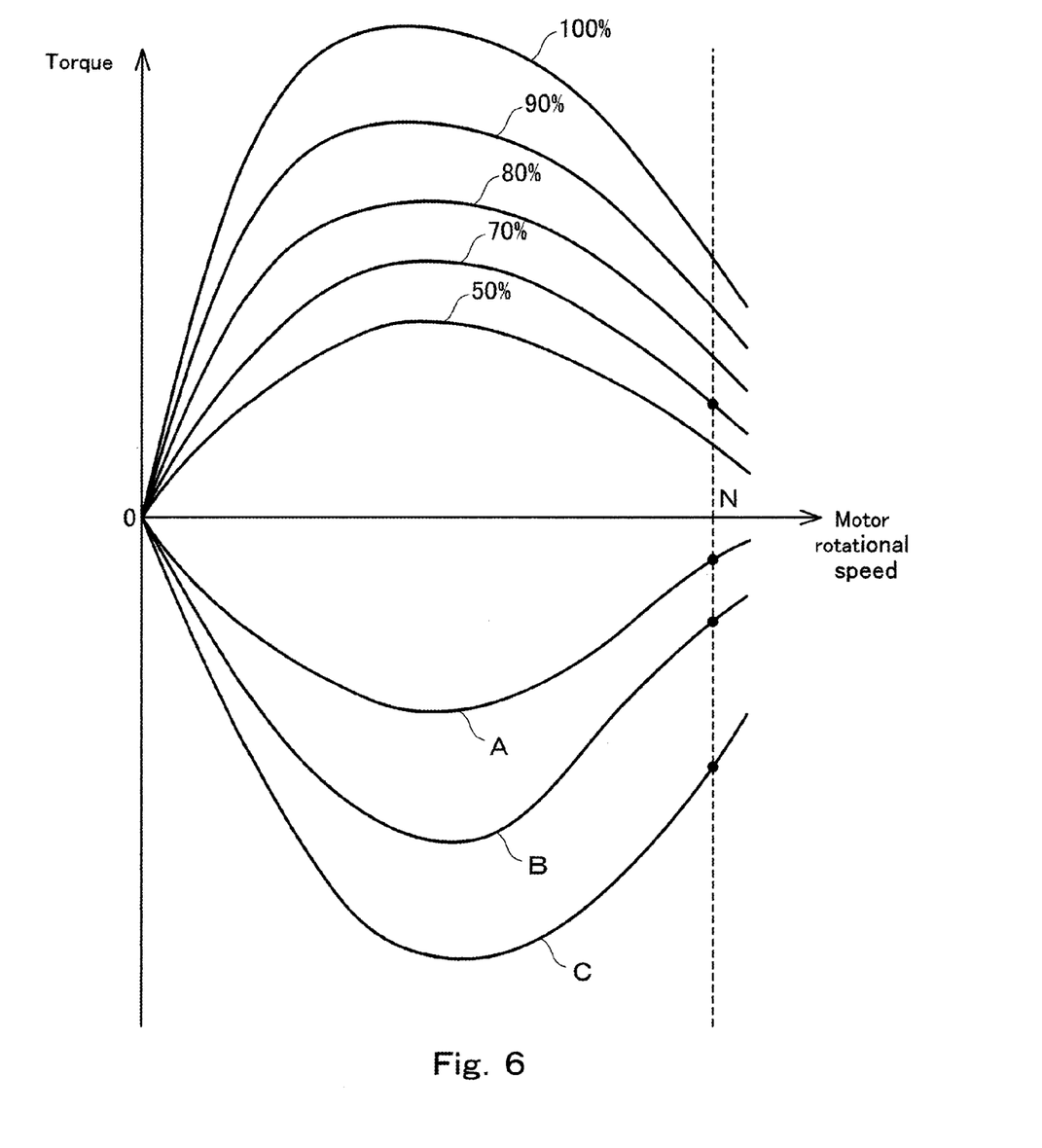
FIG. 6 is a graph schematically showing the characteristic of output torque of the electric motor in a case where regenerative torque is adjusted in the regenerative brake control system of FIG. 2.

Although in the above embodiment, the regenerative torque is compensated in proportion to the operation amount of the regeneration adjustment lever 32, the compensation amount $\Delta T_{rr}$ of the regenerative torque may be changed in a stepwise manner by selecting the regenerative mode by using the regenerative mode switch 33. FIG. 6 is a graph schematically showing the characteristic of the output torque generated in the electric motor 5 in a case where the regenerative mode is selected in the regenerative brake control system 100. In the graph of FIG. 6, a horizontal axis indicates the motor rotational speed, while a vertical axis indicates the motor output torque.

As in the graph of FIG. 5, curves in the positive value range of the output torque indicate the output characteristics of the electric motor 5 during the power running such that the output characteristics correspond to the accelerator generation amounts, respectively, as in the case of FIG. 5.

In contrast, curves in the negative value range of the output torque indicate the characteristics of the output torque of the electric motor 5 during the regenerative running FIG. 6 shows the characteristics of the regenerative torque at three levels of A, B, C, in the order of increasing regenerative torque. For example, it is supposed that the mode A is set in the initial setting. The mode A can be shifted to the mode B, and then to the mode C, by operating the upshifting button 33a for the regenerative mode. Conversely, the mode C can be shifted to the mode B, and then to the mode A, by operating the downshifting button 33b for the regenerative mode. In this way, the rider can easily change the adjustment amount of the regenerative torque by using the regenerative mode switch 33.

In a case where both of the regeneration adjustment lever 32 and the regenerative mode switch 33 are provided, the regenerative torque may be adjusted based on both of the compensation amount $\Delta T_{rrL}$ corresponding to the regeneration adjustment lever 32 and the compensation amount $\Delta T_{rrS}$ corresponding to the regenerative mode switch 33.

Although in the present embodiment, the two buttons which are the upshifting button and the downshifting button, are provided as the regenerative mode switch 33, only one button may be provided as the regenerative mode switch 33. In this case, for example, the mode may be sequentially shifted in the order of the mode A, the mode B, the mode C, the mode A, etc. every time the button is pushed. Although in the present embodiment, the reference regenerative torque is set based on the detected value of the motor rotational speed, the present invention is not limited to this. For example, the reference regenerative torque may be set based on the vehicle state such as a change (transmission) gear ratio, instead of the motor rotational speed.

Specifically, for example, the reference regenerative torque may be set such that the regeneration amount increases as the motor rotational speed is closer to a specified value, and decreases as the motor rotational speed is further away from the specified value. Or, the reference regenerative torque may be set such that the specified value is smaller than a maximum motor rotational speed, and thereby the regeneration amount is smaller when the motor rotational speed is extremely small or extremely large.

Or, for example, the regeneration amount may be changed based on the reduction gear ratio of the transmission in such a manner that the regeneration amount is larger when the reduction gear ratio is higher than when the reduction gear ratio is lower. Or, the regeneration amount may be changed with a passage time in such a manner that the regeneration amount is increased from when the regeneration has been started until a specified time has passed, and is decreased when the specified time has passed.

The reference regenerative torque may be set such that the regeneration amount is decreased with a decrease in the vehicle speed or the motor rotational speed. In this case, at a time point when the vehicle speed or the motor rotational speed reaches a value which is less than a predetermined value, regenerative control may be terminated. This makes it possible to prevent a situation in which the vehicle speed becomes very slow and driving becomes unstable, or the vehicle body drives rearward undesirably, due to the regenerative braking.

In a case where the absolute value of a change in the accelerator operation amount, which occurs with time until the accelerator operation amount reaches a predetermined value or less, is large, specifically, in a case where the accelerator grip is relatively quickly rotated, the regeneration amount may be set larger than in a case where the accelerator grip is relatively slowly rotated.

The reference regenerative torque is preferably set so that a slip in the middle of the regenerative braking is prevented. The regeneration amount may be decreased when a monitored value of the slip exceeds a set value. For example, the monitored value may be a rotational speed difference between the front and rear wheels, or a value obtained by dividing the rotational speed difference by the vehicle speed.

Or, the monitored value may be compensated based on a gear ratio and a vehicle speed. For example, preferably, whether or not to prevent the slip may be selected by the rider. In a case where the slip prevention setting is selected, the regenerative braking may be allowed to occur within a range in which the monitored value associated with the slip does not exceed a set value, when the regeneration amount is increased by using the adjustment lever. This can more effectively suppress the slip caused by the regenerative braking.

Conversely, the regenerative braking may occur such that the monitored value associated with the slip exceeds the set value, when the regeneration amount is increased by using the adjustment lever. This allows the rider to command the regeneration amount to be increased even when the monitored value is set to a relatively small value, which improves convenience.

The reference regenerative torque may be set based on the detected value of a bank angle sensor such that the reference regenerative torque decreases as the bank angle of the vehicle body increases. This makes it possible to prevent a situation in which the vehicle speed decreases rapidly and the vehicle body becomes unstable, before or during a turn. Even in the case where the reference regenerative torque associated with the turn is small as described above, the regenerative braking can be used to adjust the posture of the vehicle body before and during a turn, by making compensation for increasing the regenerative torque by the rider's operation of the regeneration adjustment lever. This allows the rider to make use of the regenerative braking to adjust the posture of the vehicle body at the start of a turn according to the rider's technique. In this case, the regenerative torque is preferably compensated by using the regeneration adjustment lever such that the effect of the bank angle is made less than the reference regenerative torque.

The reference regenerative torque may be set so as to gradually reach the target value with a passage of time. This can prevent rapid deceleration at the start of the regenerative braking. Thus, even when the regeneration amount at the time of generation of the regenerative torque is small, the rider can realize rapid deceleration at the start of regenerative braking, by making compensation for increasing the regenerative torque by using the regeneration adjustment lever. This allows the rider to make use of the regenerative braking to adjust the speed before the turn according to the rider's technique. In this case, the regenerative torque is preferably compensated by using the regeneration adjustment lever in such a manner that the regenerative torque reaches a target value in a shorter time than the reference regenerative torque does.

In the present embodiment, the regeneration adjustment lever 32 as the regeneration operation member is provided separately from the brake lever 31 or the foot brake lever 35 as the braking operation member. This can adjust the regenerative braking amount independently of the braking operation.

In addition, in the present embodiment, the regeneration adjustment lever 32 as the regeneration operation member is provided separately from the clutch lever 34 as the clutch operation member. This can adjust the regenerative braking amount independently of the clutch operation.

Although in the above described embodiment, the regeneration condition is such that the accelerator operation amount is 0[%] and a change in the accelerator operation amount which occurs with time and is just before the accelerator operation amount reaches 0[%], is a negative value, the present invention is not limited to this. For example, the regeneration condition may be such that the accelerator operation amount is less than a predetermined value which is other than 0[%], or may be set based on a driving speed. As in the case of the driving speed, the regeneration condition may be set based on the motor rotational speed.

In the regeneration condition, it is sufficient that at least the accelerator operation amount is equal to or less than a predetermined value. The regenerative running may be initiated even when a change in the accelerator operation amount which occurs with time and is just before the accelerator operation amount reaches 0[%], is a value which is other than a negative value. The regeneration control may not be performed when the vehicle speed (motor rotational speed) is equal to or lower than a predetermined speed. This can prevent the braking amount from being increased to excess. Or, the regeneration control may not be performed, when the clutch has been operated. This can provide driving feeling which is similar to that provided by a motor including an engine. The regeneration initiation condition is merely exemplary, and can be set as desired based on the detected values of the sensors or vehicle conditions.

In the above embodiments, a case where the operation amount of the accelerator grip is zero has been exemplarily described. In a case where the regeneration adjustment lever is operated in a state in which the accelerator grip has been operated, the torque command may be set smaller with respect to the reference driving torque generated by the operation of the accelerator grip. Or, the torque command may be set such that the output torque decreases as the operation amount of the regeneration adjustment lever increases. In other words, the regeneration adjustment lever may serve as an operation member operated to provide a speed decrease command. Since the two operation members, which are the accelerator grip and the regeneration adjustment lever, provide the torque command, the torque command can be finely adjusted.

Or, the mode shifting may be permitted over the entire speed range during driving, in response to a change command of the regenerative mode, input by the shifting button. This can quickly adjust the regeneration. In this case, the regeneration amount may be gradually changed with a passage of time, when the mode is shifted. This can prevent a rapid change in the regeneration amount. Or, the mode shifting may be permitted, in response to a change command of the regenerative mode, in non-regenerative braking. This can also prevent a rapid change in the regeneration amount. Since the setting means which can be adjusted by the rider, is provided separately from the setting means of the reference regeneration amount, the reference regenerative torque can be easily set as in the present embodiment.

Although in the present embodiment, the regeneration adjustment lever and the regenerative mode switch are provided to adjust the regenerative torque, a case where no adjustment lever is provided and only the switch is provided is included in the present invention. The configuration of the present embodiment is merely exemplary as the configuration of the operation member for adjusting the regenerative torque. Other embodiments may be used so long as the operation amount of the rider's operation of the operation member is detectable.

The electric motor 5 is not particularly limited so long as the instantaneous torque of the electric motor 5 can be controlled by using the power converter. For example, the electric motor 5 may be a DC motor.

Although in the above embodiment, the vehicle is the straddle-type electric motorcycle, the vehicle may be a scooter-type electric motorcycle.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Although in the above embodiment, the electric motorcycle is described, the present invention is applicable to vehicles which are other than the electric motorcycle. For example, the present invention is preferably applicable to a vehicle whose vehicle body is banked during a turn.

INDUSTRIAL APPLICABILITY

The present invention is useful in adjustment of a regeneration amount which is performed by a rider.

REFERENCE CHARACTER LIST

1 . . . electric motorcycle
5 . . . electric motor
22 . . . control unit (ECU)
23 . . . determiner section
24 . . . calculation section
25 . . . motor control section
26 . . . storage section
32 . . . regeneration adjustment lever
33 . . . regenerative mode switch
40 . . . accelerator operation amount sensor
42 . . . regeneration operation amount sensor
43 . . . regenerative mode sensor
60 . . . display unit
100 . . . regenerative brake control system

The invention claimed is:

1. A regenerative brake control system of a vehicle including a front wheel which is a driven wheel and a rear wheel which is a drive wheel, the rear wheel being mounted to a swing arm, the regenerative brake control system comprising:
an electric motor for activating the rear wheel;
a first braking operation member which is operated to mechanically brake the rear wheel;

a regeneration operation member which is provided separately from the first braking operation member and operated to set a regenerative torque of the electric motor;
a detecting device for detecting a vehicle state which is other than a state of the regeneration operation member; and
a control unit which sets a reference regenerative torque according to the vehicle state detected by the detecting device;
wherein the control unit controls the regenerative torque generated in the electric motor such that a value of the regenerative torque generated in the electric motor reaches a target value which is a value of an adjusted regenerative torque obtained by compensating the reference regenerative torque based on an operation amount of the regeneration operation member.

2. The regenerative brake control system according to claim 1, further comprising:
an acceleration operation member which is operated to set an output torque or an acceleration rate of the vehicle,
wherein the control unit sets the reference regenerative torque when an operation amount of the acceleration operation member is equal to or smaller than a predetermined value, and
wherein the regeneration operation member is provided separately from the acceleration operation member.

3. The regenerative brake control system according to claim 1, further comprising:
a clutch operation member which is operated to perform switching between a driving power cut-off state and a driving power transmitted state,
wherein the regeneration operation member is provided separately from the clutch operation member.

4. The regenerative brake control system according to claim 1,
wherein the regeneration operation member is configured to select one from among a plurality of adjusted regeneration amounts.

5. The regenerative brake control system according to claim 1,
wherein the reference regenerative torque is changeable according to a vehicle condition.

6. The regenerative brake control system according to claim 1,
wherein the detecting device is a bank angle sensor for detecting a bank angle of the vehicle body of a vehicle, and
wherein the control unit sets the reference regenerative torque based on a detected value of the bank angle sensor.

7. The regenerative brake control system according to claim 1,
wherein the control unit controls the regenerative torque generated in the electric motor such that the regenerative torque gradually gets closer to the target value and reaches the target value, when the reference regenerative torque is the target value.

8. The regenerative brake control system according to claim 1, further comprising:
a second braking operation member which is provided separately from the first braking operation member and operated to mechanically brake the front wheel.

9. The regenerative brake control system according to claim 1,
wherein the control unit sets the reference regenerative torque, when the control unit determines that a regeneration condition is satisfied, based on the vehicle state, and controls the regenerative torque generated in the electric motor such that a value of the regenerative torque generated in the electric motor reaches a target value which is a value of the reference regenerative torque, when the regeneration operation member is not operated.

10. The regenerative brake control system according to claim 1,
wherein the control unit sets the reference regenerative torque according to a rotational speed of the electric motor which is the vehicle state.

11. The regenerative brake control system according to claim 2,
wherein the predetermined value indicates an operation position to which the acceleration operation member is operated by a specified range from a reference position at which the acceleration operation member is not operated.

12. The regenerative brake control system according to claim 1,
wherein the vehicle is a motorcycle, and
wherein the reference regenerative torque is set such that the reference regenerative torque decreases as a rotational speed of the electric motor is closer to zero, when a rotational speed range of the electric motor is equal to or less than a first value.

13. The regenerative brake control system according to claim 1,
wherein the vehicle is a motorcycle, and
wherein the reference regenerative torque is set such that the reference regenerative torque decreases as a rotational speed of the electric motor increases, when a rotational speed range of the electric motor is equal to or larger than a second value.

14. The regenerative brake control system according to claim 1,
wherein the vehicle is a motorcycle, and
wherein the reference regenerative torque is set such that the reference regenerative torque decreases as a rotational speed of the electric motor is closer to zero, when a rotational speed range of the electric motor is equal to or less than a first value, and decreases as the rotational speed of the electric motor increases, when the rotational speed range of the electric motor is equal to or larger than a second value which is larger than the first value.

15. The regenerative brake control system according to claim 1,
wherein the control unit compensates the reference regenerative torque based on the operation amount of the regeneration operation member, and irrespective of the vehicle state which is detected by the detecting device and is other than the state of the regeneration operation member, and
wherein the control unit controls the regenerative torque generated in the electric motor such that a value of the regenerative torque generated in the electric motor reaches a target value which is a value of the compensated reference regenerative torque.

16. A regenerative brake control system of a vehicle including a front wheel which is a driven wheel and a rear wheel which is a drive wheel, the rear wheel being mounted to a swing arm, the regenerative brake control system comprising:
an electric motor for activating the rear wheel;
a regeneration operation member operated to set a regenerative torque of the electric motor; and
a detecting device for detecting a vehicle state which is other than a state of the regeneration operation member;

wherein the regenerative brake control system controls the electric motor to generate the regenerative torque based on the vehicle state detected by the detecting device and an operation amount of the regeneration operation member.

17. A regenerative brake control system comprising:

an electric motor for activating a drive wheel;

a regeneration operation member operated to set a regenerative torque of the electric motor;

a detecting device for detecting a vehicle state which is other than a state of the regeneration operation member; and a control unit which sets a reference regenerative torque according to the vehicle state detected by the detecting device, when the control unit determines that a regeneration condition is satisfied based on the vehicle state;

wherein the control unit controls the regenerative torque generated in the electric motor such that a value of the regenerative torque generated in the electric motor reaches a target value which is a value of the reference regenerative torque, when the regeneration operation member is not operated, and wherein the control unit controls the regenerative torque generated in the electric motor such that a value of the regenerative torque generated in the electric motor reaches a target value which is a value of an adjusted regenerative torque obtained by compensating the reference regenerative torque based on an operation amount of the regeneration operation member, when the regeneration operation member is operated.

* * * * *